United States Patent [19]
Eustance

[11] 3,754,173
[45] Aug. 21, 1973

[54] STABILIZED ESTER IMPREGNATED CAPACITOR

[76] Inventor: John W. Eustance, 7838 Merritt Rd., South Glens Falls, N.Y. 12801

[22] Filed: Aug. 16, 1972

[21] Appl. No.: 281,204

[52] U.S. Cl................. 317/259, 252/63.7, 317/258
[51] Int. Cl........................................... H01g 3/195
[58] Field of Search.................... 317/258; 252/63.7

[56] References Cited
UNITED STATES PATENTS
3,275,914  9/1966  Hoffman............................. 317/258
3,363,156  1/1968  Cox..................................... 317/259
3,689,811  9/1972  Hoffman............................. 317/259

Primary Examiner—Elliot Goldberg
Attorney—James J. Lichiello et al.

[57] ABSTRACT

A capacitor impregnant comprises an aromatic ester such as dioctyl phthalate which has been stabilized with between about 0.1 and 10 percent by weight of an epoxide such as diglycidyl ether of bisphenol A dissolved therein.

17 Claims, 6 Drawing Figures

Patented Aug. 21, 1973

3,754,173

STABILIZED ESTER IMPREGNATED CAPACITOR

BACKGROUND OF THE INVENTION

This invention relates to a stabilized liquid ester impregnant for electrical devices, and more particularly, to an improved stabilized aromatic ester impregnant particularly adapted for electrical capacitor use.

Liquid impregnants for electrical capacitors should have a high dielectric constant, maintain a low dissipation factor, and be compatible with the other materials in the capacitor structure. At the same time, the impregnants must withstand elevated and fluctuating temperature, pressure, and voltage stress conditions with excellent electrical characteristics for a long operative life of the capacitor. Ease of handling, impregnating and other such physical characteristics are also much desired.

There are a great number of different kinds of dielectric liquid impregnated capacitors which have been developed over the years to meet specific application requirements. Broadly speaking, among the larger capacitors are found high voltage (above 660 volts AC), and low voltage power capacitors, which also may be denoted as energy storage capacitors, induction heating capacitors, high frequency capacitors, and power factor correction capacitors. Small capacitors are usually found in application categories as motor run capacitors and lighting capacitors.

In some instances, different capacitors use different impregnants. Accordingly, at the present time, there are a number of commonly used liquid impregnants such as chlorinated diphenyl, mineral oil, castor oil, and silicone oil. However, the most outstanding and widely used of these impregnants is chlorinated diphenyl, which has been the major impregnant used in most capacitor applications in the USA for many years. Significantly, it is essentially the exclusive impregnant employed in all power, motor run, and ballast (fluorescent lighting) capacitors in the USA, and several million pounds yearly are used for these capacitors.

The polychlorinated biphenyls, a term which is inclusive of chlorinated diphenyl as used herein, are broadly referred to as PCB's. The polychlorinated biphenyls have recently been associated with ecological problems and their continued use in applications other than electrical usage, the rising costs, and the potential ecological problem of chlorinated diphenyls have spurred the search for a replacement capacitor impregnant. A replacement impregnant should have the same or better general characteristics as chlorinated diphenyl and still provide the outstanding electrical and compatibility performance with the two most important present-day capacitor dielectrics, paper and polypropylene. In this connection, a typical and rigorous application for such an impregnant would be in an AC capacitor subjected to high voltage stress conditions such as described in U. S. Pat. No. 3,363,156, Cox, assigned to the same assignee as the present invention.

Ordinarily, there are a large number of liquid dielectrics which would be candidates as capacitor impregnants except for their short life characteristics or because they are not applicable for most capacitor applications generally. Many of the known capacitor impregnants also suffer because of their limited applicability. For example, castor oil is usually regarded as fairly limited to capacitors for direct current applications. For these reasons, a variety of stabilizers have been developed for use with capacitor impregnants. For example, known stabilizer additives for the most common impregnant, chlorinated diphenyl, were developed or chosen to be scavengers for hydrogen and chlorine atoms released from or generated from the impregnant and other materials in the capacitor during its operation. For non-halogenated impregnants, were chlorine, bromine, etc. were not present or generally releasable in deleterious form, other stabilizer additives were used. These stabilizer additives were not satifactorily effective for many kinds of capacitors and capacitor application because they provided no marked and immediate differences in the operating characteristics of the impregnant in the capacitor environment. One example is an oxidation inhibitor which performs its narrow function without much immediate effect on other characteristics which may precede its function and contribute to high power factors.

A number of impregnants from the class of materials known as esters have been disclosed as capacitor impregnants. Esters may be described as aliphatic esters or aromatic esters. The aliphatic esters have found only limited applications as capacitor impregnants. One common aliphatic ester is castor oil which has found only limited application in 2 narrow area of DC capacitors and high frequency capacitors. For the greater application area of AC capacitors and low frequency capacitors, the aromatic liquids have proven to be unstable. The aromatic esters found little if any use and acceptance primarily because of even greater instability and extremely high power factor or dissipation factor, and hydrolysis. In U. S. Pat. Nos. 1,895,376, Clark; and 1,966,162, Clark; both assigned to the same assignee as the present invention, certain aromatic esters such as diethyl phthalate and tricresyl phosphate are disclosed. Also mentioned is the overriding disadvantage of high power factor of the materials at elevated temperatures. Other than the high power factor and hydrolysis problems, the aromatic esters have several most favorable attributes and characteristics as electrical capacitor impregnants. Their capacitor development however never materialized because the noted disadvantages were too severe and there were no known practical solutions.

It has now been discovered that members of a class of materials known as the epoxides can be used to effectively stabilize certain aromatic esters for use in capacitors operable at elevated temperatures. Surprisingly these stabilized esters provide a capacitor with resultant very low power factors over a long capacitor life.

Accordingly, it is an object of this invention to provide an improved epoxide stabilized aromatic ester impregnant for electrical capacitors.

It is another object of this invention to provide an improved epoxide stabilized phthalate aromatic ester impregnant for electrical capacitors.

It is another object of this invention to provide an improved epoxide stabilized phthalate ester impregnant for electrical capacitors subjected to high voltage stress conditions.

It is a further object of this invention to provide an improved epoxide stabilized di (2-ethylhexyl) phthalate impregnant for electrical capacitor applications.

It is yet another object of this invention to provide a capacitor which utilizes a synthetic resin film as the sole dielectric material and an epoxide stabilized DOP as the impregnant.

It is a further object of this invention to provide an epoxide stabilized DOP impregnant for AC capacitors with low power factors.

SUMMARY OF THE INVENTION

One form of this invention comprises the combination of an epoxide stabilized liquid aromatic ester for use as an electrical capacitor impregnant. More specifically, the aromatic ester is a derivative of phthalic acid, and for the purpose of this invention, the preferred ester is the reaction product of phthalic acid and 2-ethylhexyl alcohol, known as di (2-ethylhexyl) phthalate or dioctyl phthalate (DOP). As hereinafter employed in this specification, the term DOP refers to di (2-ethylhexyl) phthalate.

Alternating current capacitor tests have shown that DOP is not a preferred impregnant for high voltage stressed capacitors in spite of certain attractive properties such as capacitor compatibility, high dielectric constant, and biodegradability. These good properties are overshadowed by instability under high electrical stress and resultant short life. One indication of short life in a capacitor is a rapidly rising or high dissipation or power factor. Power factor, which is a measure of electrical loss in a capacitor, is a critical item in high voltage stressed alternating current power capacitors generally. Electrical instability leads to an early breakdown or failure which is critical for long life capacitors such as those obtainable with the present chlorinated diphenyl impregnated power capacitors.

Stabilization of an impregnant usually involves the addition of a further material to the impregnant which will improve the impregnant by neutralizing impurities found in the capacitor, or generated therein, which cause degradation. Ordinarily, the impregnant to be improved is already a good and effective capacitor impregnant and the additive is an improvement. DOP is a liquid material that, when utilized as an impregnant in capacitors subjected to elevated temperatures and high voltage stresses, shows a rapid rise in power factor and subsequent capacitor failure. However, it has not been discovered that DOP may be effectively stabilized or altered so that it may be used as the sole impregnant in an AC capacitor and under high voltage stress conditions. More particularly, it has been discovered that epoxides, which were formerly considered to be chlorine (Cl) or hydrogen chloride (HCl) scavengers only, interact in a different manner to stabilize DOP in a capacitor embodiment where hydrogen chloride or chlorine are not ordinarily present in the materials or generated therefrom.

DESCRIPTION OF THE PREFERRED EMBODIMENTS

DOP is a material which has been known in the art of chemical plasticizers for synthetic resin materials and is commercially available from several sources, for example, under the name "Flexol" describing a Union Carbide Company product. A description of DOP as a plasticizer is found in The Technology of Solvents and Plasticizers by Arthur K. Doolittle, copyright 1954 by Union Carbide and Carbon Corp., Properties of Individual Plasticizers, pages 962–964. Additionally, U.S. Pat. No. 1,923,938 describes this product in more detail. Typical characteristics of this product are given in the following Table 1.

TABLE 1

Typical Properties of DOP Liquid

Di (2-ethylhexyl) phthalate, $C_{24}H_{38}O_4$, Molecular Weight = 391
| | |
|---|---|
| Density 25°C | 0.987 gm/cm$^3$ |
| Refractive Index N (D/20°C) | 1.4859 |
| Boiling Range | 229°C/5 mm pressure |
| Pour Point | −55°C |
| Dielectric Constant (DK) | 5.24/25°C |
| % Dissipation Factor | 7.7%, 8.5% at 100°C/100 Hz as received in 55 gal. drums |
| Viscosity | 100°F: 30 cs (1499 = 18 cs) |
| | 210°F: 4.2 cs (1499 = 2.5 cs) |

In the practice of this invention, DOP has been used with (a) capacitors wherein only a paper material was used as the dielectric material, (b) capacitors wherein only a synthetic resin was used as the dielectric, and (c) capacitors utilizing mixed combination of synthetic resin and paper dielectrics.

Typically, a preferred capacitor embodiment of this invention includes one or more capacitor roll sections which are rather tightly contained in a close fitting can or casing filled with a liquid impregnant and sealed. The capacitor roll section comprises alternate strips of dielectric material and electrode material which may be assembled in various arrangements.

Figure 1:
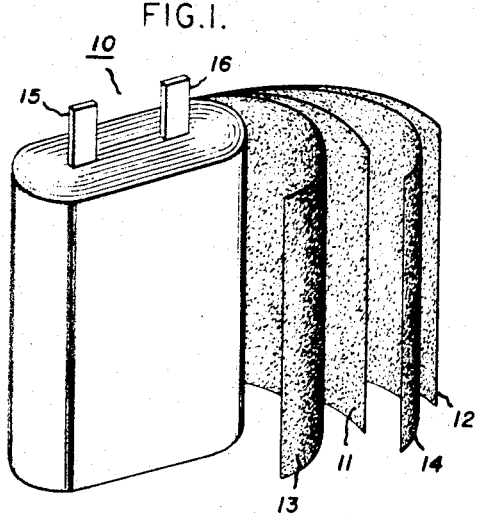
FIG. 1 is an exemplary capacitor roll section utilizing paper as the dielectric.
Figure 3:
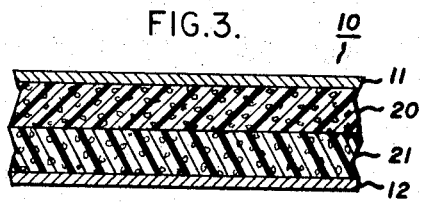
FIG. 3 is a cross-section view of a part of a capacitor roll section utilizing synthetic resin film as the dielectric.
Figure 4:
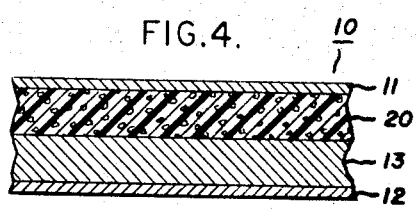
FIG. 4 is a view of a part of a capacitor roll section utilizing mixed synthetic resin film and paper as the dielectric.
Figure 5:
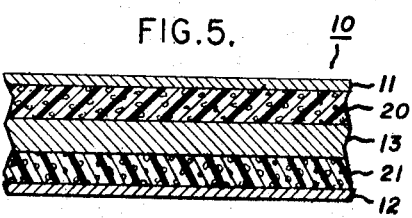
FIG. 5 is a cross-section view of a part of a capacitor roll section utilizing a synthetic resin film in a different dielectric arrangement in a capacitor.

Referring now to FIG. 1, there is disclosed an exemplary capacitor roll section 10 including a pair of electrode foils 11 and 12 and dielectric paper strips 13 and 14. The electrode foils may also be formed as metallized coatings on the paper strips 13 and 14 or on separate and additional dielectric strips of various materials. Suitable electrical connectors or tabs 15 and 16 are utilized to connect the electrode foils to capacitor terminals. The roll section 10 is placed in the can 17 of FIG. 2 and the can is filled with a liquid impregnant and sealed. Connectors 18 and 19 of the can connect to tabs 15 and 16 of the roll section 10 for electrical connection purposes. Each dielectric paper strip 13 and 14 may be replaced with multiple paper strips in order to have a thicker dielectric or to take the electrical advantage of multiple sheets. Each strip 13 and 14 may also be replaced with one or more synthetic resin strips 20 and 21, as shown in FIG. 3, or with a mixed dielectric of a paper strip 13 and a resin strip 20, as shown in FIGS. 4 and 5. Additional typical constructions and embodiments are shown in the aforenoted U.S. Pat. No. 3,363,156 Cox.

In these typical embodiments, the dielectric liquid impregnant is caused to penetrate, permeate and fill essentially all of the gaps, voids and spaces found in and between the dielectric strips 13 and 14. This kind of impregnation is necessary to reduce the occurrence of deleterious corona discharge in AC capacitors at their application voltage, and to prevent arcing. The impregnant, by being in the electrical field between the electrodes, is subjected to high electrical stresses, some corona discharge, elevated and fluctuating temperatures, and other deleterious environmental conditions. In power capacitors, for example, these conditions are not expected to cause failure of the capacitor over an active life of from 10–20 years.

Consequently, in the capacitor art, great care is taken to provide high purity and compatible materials such as paper and chlorinated diphenyl, and great effort is utilized to remove gases and water vapor by high temperature evacuation processes. Impurities in a capacitor may be present in the materials and structure by way of gases, water vapor and solid impurities such as extraneous chemical elements and compounds found in the other materials, e.g., in the paper or in the polypropylene film. These impurities react unfavorably with the impregnant or otherwise combine to react with the impregnant, resulting in degradation usually first noticed by an increase in power factor. Other dormant impurities may be released by the impregnant. For example, the chlorinated diphenyl impregnant is a solvent which dissolves and transports impurities, and leaches out impurities in the dielectric, which are detrimental to the capacitor. In the case of chlorinated diphenyl impregnated capacitor minor corona causes a release of hydrogen and chlorine into the capacitor and cause failure of the capacitor. Chlorine therefore was looked upon as an undesirable element to have in a capacitor impregnant or incorporated in other capacitor materials. Unfortunately, it remained, for other reasons, a critical component in the best available AC capacitor impregnant, i.e., polychlorinated diphenyl. Because of these conditions, many additives were proposed for chlorinated diphenyl impregnants to act as HCl, chlorine or hydrogen scavengers and thus to extend the effectiveness and life of the capacitors. Among these additives were tin tetraphenyl, anthraquinone, and epoxides.

DOP contains no chlorine components for which these additives could be effective. In addition, the known hydrolysis problems of DOP would not indicate it to be a good capacitor impregnant. Tests made on AC capacitors subjected to high voltage stress conditions, such as those described with respect to FIGS. 1 and 2 indicate, initially, fairly good electrical results. However, on accelerated life tests at elevated temperature, increasing and prohibitive numbers of capacitor failures occurred, primarily indicated by rising power factors and subsequent electrical failure. Tests were repeated with the capacitor of FIGS. 3 and 4, which differ from the capacitor of FIG. 1 in that synthetic resin film strips are included in or replace the paper strips 13 and 14 of FIG. 1. Failures similar to those of the paper capacitor occurred. Examination in both instances failed to show the presence of any HCl or chlorine such as would be expected in a chlorine diphenyl impregnated capacitor.

It was unexpectedly discovered that the addition of an epoxy compound to the DOP effectively stabilized a DOP impregnated capacitor against early failure and short life. A repeat of the above and other appropriate tests showed dramatic reduction of failures as noted in the following examples. In these examples, the DOP was purified by a column filtering process utilizing alumina or fullers earth as the filtering material. In addition, the impregnation process relates generally to that as described in the noted U.S. Pat. No. 3,363,156 Cox, including drying the capacitors by subjecting them to elevated temperatures, which may be above 100°C and usually below about 125°C, for several hours. During this cycle, the capacitors were under vacuum conditions of less than 200μ mercury. After impregnation with DOP, which was at about 70° to 80°C, the capacitors were sealed and then heat soaked at about 100°C for several hours, e.g., 4 to 16 hours. In the heat soak time, the lag for the temperature in the capacitor to reach the desired level and the cooling down to room temperature is not included. The times given are the times at temperature.

EXAMPLE I

Figure 2:
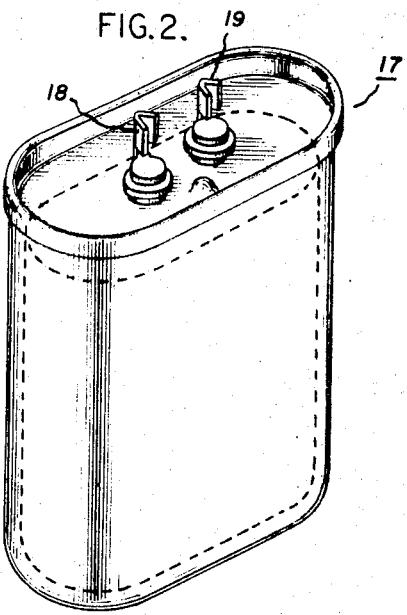
FIG. 2 is a complete capacitor in the form of a sealed can containing the roll section of FIG. 1.

Two sets of capacitors of 10 each as described with respect to FIGS. 1 and 2 were assembled. The paper dielectric strips 13 and 14 each comprised a pair of paper strips, one of which was 1 inch wide an 0.30 mil thick and the other was 1 inch wide and 0.35 mil thick. Unsealed capacitors of FIG. 2 were subjected to elevated temperature of 125°C and vacuum conditions for several hours. Thereafter, the Group I capacitors were filled with purified DOP and the Group 2 capacitors were filled with the same purified DOP to which was added 1 percent by weight of an epoxide known as diglycidyl ether of bisphenol A (Dow epoxy resin No. 330, a product of Dow Chemical Co.). Results are indicated in the following table.

LIFE TEST

380 Volts, AC(VAC) and at 100°C

| | Failed/hours |
|---|---|
| Group 1 | 6 – 4200 |
| Group 2 (Epoxide) | 0 – 4279 |

550 Volts, AC(VAC) and at 85°C

| Group 1 | 7 – 1130 |
|---|---|
| Group 2 | 2 – 4205 |

It is seen from the foregoing values that failures are significantly reduced and life extended in those capacitors containing the epoxide additive. In the first life test, the capacitors were tested under rigorous conditions of 100°C and 380 volts AC. In spite of these conditions, there were no failures in 4,279 hours of operation while six of the capacitors not containing epoxide had failed in 4,200 hours. Under even more rigorous conditions of the second life test, the improved results are equally surprising.

The marked benefit of epoxide addition to paper dielectric capacitors is noteworthy. Ordinarily the known generation of water vapor by the paper and the known hydrolysis to ionizable products of DOP ester would seem incompatible. However, a very small amount of epoxide appears to provide a favorable reaction greater than expected considering the stoichiometric ratios of the reactants.

In the following example, capacitors of the FIG. 3 kind, i.e., using a synthetic resin polypropylene film 20 and 21 as the dielectric, were subjected to similar testing.

EXAMPLE II

In this example, two groups of 10 each of unsealed capacitors were assembled, as illustrated in FIGS. 1, 2 and 3. The dielectric was biaxially oriented isotactic polypropylene strips 1-⅞ inches wide and 0.35 mil thick. The capacitors were subjected to room temperature vacuum drying conditions as well as room temperature impregnation conditions. The Group 1 capacitors contained the same purified DOP but with the addition of 1.0 percent by weight of diglycidyl ether of bisphenol A. The capacitors were vacuum dried and impregnated at room temperature, thereafter sealed, and subjected to a heat soak at 100°C for two hours. Results are as follows:

CAPACITANCE/POWER FACTOR AT 300 VAC AND 85°C

|  | 100°C | 85°C | DC dielectric strength as kilovolts per mil thickness of polypropylene |
|---|---|---|---|
| Group 1 | 3.52/.39 | 3.58/.34 | 5.49 |
| Group 2 (Epoxide) | 3.54/.28 | 3.60/.26 | 5.57 |

The same units were subjected to a life test as follows:

LIFE TEST
(300 VAC/85°C)

|  | Hours to failure |
|---|---|
| Group 1 | 3 remaining after 256 hours |
| Group 2 (Epoxide) | 7 remaining after 256 hours |

EXAMPLE III

In this example, an experiment was conducted to compare capacitors of this invention with prior similar capacitors utilizing chlorinated diphenyl as the impregnant to which had been added about 0.3 percent by weight of epoxide. Three groups of capacitors (ten in each group) were assembled using the construction of FIG. 3. The dielectric was polypropylene film, 1-⅞ inches wide and 0.35 mil thick as in Example II. The capacitors were dried under vacuum at room temperature for several hours and then impregnated at room temperature with the noted impregnant to which had been added 1.0 percent by weight of diglycidyl ether of bisphenol A. Thereafter, these capacitors were sealed and subjected to a heat soak for a period of 4 hours at 100°C. Life test and dielectric strength (DS) results measured at 180 volts DC (VDC) per second rate of rise at 85°C within the scope of this example are given as follows:

|  | Initial DS 85°C-KV avg. | No. Failed/No. Tested/Hours 380 VAC/ 100°C | 550 VAC/ 85°C |
|---|---|---|---|
| Group 1 Purified DOP No Epoxide | 1.92 | 7-10-256 | 6-9-256 |
| Group 2 Purified DOP 1% Epoxide | 1.95 | 6-9-867 (first failure at 394) | 7-9-835 |
| Group 3 Chlorinated Diphenyl +Epoxide | 1.76 | 8-9-256 | 9-9-177 |

These results show that the stabilized DOP of this invention withstands high temperature life tests better than the other capacitors. Note that the first failure of DOP-epoxide capacitor at 380 VAC—100°C did not occur until after 394 hours had passed, whereas without stabilization seven DOP capacitors failed in 256 hours and eight chlorinated diphenyl capacitors failed in 256 hours.

Other capacitor structures were also assembled and treated with DOP containing as much as 10 percent by weight of diglycidyl ether of bisphenol A. For example, the structure of FIG. 5 was assembled as a small capacitor with the noted DOP impregnant, and impregnated in accordance with the teachings of the Cox patent with good results.

It can be seen from the foregoing examples that the epoxide plays a critical part in the capacitor during its operative life. The additive is characterized in this particular environment as being capable of interacting with those chemical elements or compounds ordinarily found in, or generated during operation of the electrical capacitor to prevent these compounds from breaking down or otherwise degrading the DOP. These elements and compounds, as noted, are those generated in a capacitor which utilizes DOP as an impregnant and in the absence of any materials which would generate HCl. Most of the known epoxides which are otherwise capacitor compatible appear to provide the desired result in varying degrees.

The epoxide scavenger compound of this invention may be generally characterized by the group

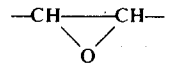

examples of which are glycidyl ethers and derivatives of ethylene oxide. Specific examples of these compounds are phenoxy oxide (phenyl glycidyl ether), glycidyl allyl ether, benzyl ethylene oxide, styrene oxide, 1,3-bis (2,3-epoxy propoxy) benzene, and 4,4'-bis (2,3-epoxy propoxy) diphenyldimethylmethane. In addition, commercially available epoxide compounds which have been found suitable for use in the invention are known as EP107 which is di(2 ethyl hexyl) 4,5 epoxy tetrahydrophthalate, EP201 which is 3,4-epoxy-6 methylcyclohexylmethyl-3,4-epoxy-6-methyl cyclohexanecarboxylate and EP206 which is 1 epoxyethyl-3,4-epoxycyclohexane. Mixtures of any two or more of such epoxide compounds may be employed if desired. Patents showing one or more of these epoxides are U.S. Pat. Nos. 3,362,908, 3,242,401, 3,242,402, 3,170,986, all of which are assigned to the same assignee as the present invention.

Tests indicate that the particular kind of epoxide is not critical. Various epoxides or mixtures of epoxides may be used so long as effective amounts are added. An effective amount is primarily related to molecular weight, reaction rate, and solubility in the impregnant. Those epoxides of higher molecular weight are preferred in greater amounts than those epoxides of lower molecular weight. In general, amounts between about 0.1 percent by weight up to about 10 percent by weight are satisfactory. The epoxides perform a function which is believed to be common to all the epoxides by reason of their chemical structure. Their reaction time and effect are favorable to DOP in the capacitor environment. In the above examples, major important was given to the comparative results of use with, and use without, epoxides.

DOP has been found to be compatible with polypropylene film dielectrics alone, or with paper. The kind of impregnation which is preferred is that described in U. S. Pat. No. 3,363,156 Cox and referred to as "essentially complete impregnation." In one form, essentially complete impregnation involves subjecting the impregnated capacitor to elevated temperature, preferably above about 80°C over a long period of time (heat soaking) to cause the DOP not only to enter the molecular structure of the polypropylene but also to cause the polypropylene to become somewhat like a semipermeable membrane with respect to DOP and permit DOP to pass through the film. The polypropylene film as described in the U. S. Pat. No. 3,363,156, i.e., a stereo regular crystalline, biaxially oriented film, is also preferred and was used in all examples herein. By crystalline, it is meant that the material has a significant crystalline content and the crystallinity dominates the physical characteristics of the material. DOP is not limited to the dielectrics noted and other members of the polyolefin group as well as other synthetic resins as the polycarbonates, polysulfones, and polyesters are usable dielectrics. The important factor is the use of DOP and an epoxide.

The stabilized impregnant of this invention, particularly DOP, is an improved impregnant for those capacitors subjected to high voltage stress, high temperature conditions. Notably, a high voltage stress condition on the dielectric, when the dielectric is a synthetic resin film such as polypropylene, is from about 750 volts per mil thickness of the polypropylene to in excess of 1,200 volts per mil with the more critical part of the high stress range commencing at about 900 volts per mil. Concurrently, capacitors with these stresses are subjected to a kind of impregnation, denoted as essentially complete impregnation in U. S. Pat. No. 3,363,156, which renders a certainty to the results, e.g., which provides, consistently, a high corona start voltage correlated to the thickness of the dielectric. In power capacitors of the high voltage kind for shunt application where the total dielectric thickness between electrodes may be on the order of 1.0 mil, the corona start voltage must be above 2,000 volts generally (at room temperature), and in many instances will exceed about 2,500 volts. In low voltage applications where thinner dielectrics are used, the corona start voltage may be lower. The corono start voltage is usually from 1-½ to 2-½ times the highest voltage stress in the dielectric at the capacitor application voltage at room temperature, and is stable under variable operating conditions of the capacitor.

DOP is useful for many different kinds of dielectric systems of the single dielectric material kind, such as all paper, all film, or mixtures thereof. An example of a mixed dielectric system is shown in the FIG. 4 arrangement wherein a sheet of paper 13 is adjacent one electrode foil 12 and a sheet of polypropylene 20 is adjacent the other electrode 11. It can be seen that other mixed dielectrics as in FIG. 5 can include two sheets of film 20 and 21 with an intermediate sheet of paper 13, or conversely two sheets of paper and an intermediate sheet of film.

Figure 6:
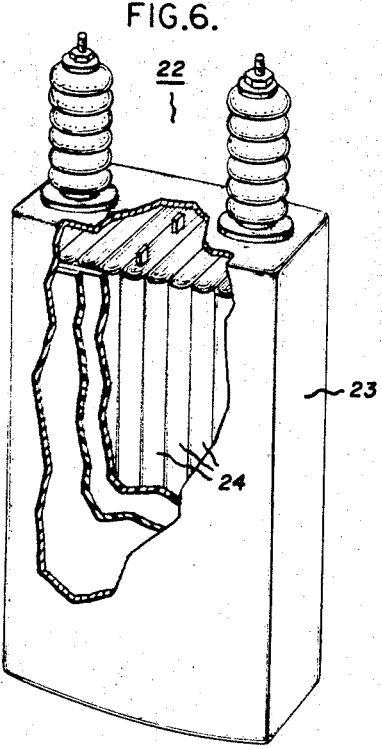
FIG. 6 is greatly reduced drawing of exemplary power capacitor utilizing multiple rolls and common to the large size power factor correction, induction heating and high frequency capacitor applications.

FIG. 6 represents a high voltage power factor correction kind of capacitor wherein a low power factor is essential to its acceptability. In FIG. 6, capacitor 22 comprises a large can or casing 23, for example of 0.8 cu. ft. volume, in which a large number (10 to 40) of elongated roll sections 10 are used. These roll sections 10 may be from 10 to 25 inches in length. To be effective, the DOP impregnant and additive must be permeated throughout each roll section 10 because failure in but one section 10 will cause failure of the entire capacitor. Therefore, these power capacitors 22 undergo extensive drying conditions, for example, by being subjected to low pressures of less than 200 μ and elevated temperatures of 100° to 150°C for 15 to 30 hours. They are filled with the impregnant while they are still under vacuum and at some elevated temperature. It is usual for the impregnant also to be at 70° – 80°C during filling of the casings. At this point, the capacitor is usually sealed and is again subjected to elevated temperatures of about 80° to 120°C for long periods of time, depending on the size of the capacitor and the kind of dielectric material used. All-paper dielectric requires a minimum period of time and may not require any subsequent heating. An all-film capacitor may require a heat soak for as much as 16 to 24 hours.

Tests were made on other aromatic ester impregnants containing epoxide additives. In one such test performed with typical capacitors as in the above examples, the dielectric was polypropylene and impregnant used was dicapryl phthalate, i.e., made from di normal-octyl alcohol. The epoxide was 1.0 percent by weight EP206. These capacitors were tested at 550 VAC at 85°C under an extremely high film stress of 1,570 volts per mil thickness of the polypropylene. Surprisingly, these capacitors, after 9,500 hours of life, are performing eqully as well as control capacitors using chlorinated diphenyl as the impregnant.

Not all dielectric liquids are satisfactory as capacitor impregnants. A dielectric liquid should have the general properties of being in purified or pufifiable form and having a boiling and freezing point outside of the operating temperature range of the capacitor and a flash point above about 175°C. Furthermore, the liquid should have a vapor pressure below atmospheric pressure for temperatures up to about 200°C and a dielectric constant above 2, particularly for synthetic resin film dielectrics such as polypropylene, and preferably from 4 and above for paper dielectrics. In addition the liquid should have a relatively low viscosity, less than about 1,000 centistokes at 25°C, and remain liquid to about −40°C. The impregnant should also have a power factor of significantly less than 10 percent at 100°C when in a generally pure form. Power factor or dissipation factor is an extremely important criteria for a capacitor, particularly an AC power factor correction capacitor, because it is ordinarily operable at elevated temperatures and is usually subjected to elevated temperatures in its manufacturing process. The power factor tends to increase rapidly with temperature. The power factor of the purified material itself should be significantly lower than 10 percent and preferably 5.0 percent measured at room temperature at 100 Hertz so that in the final capacitor the resulting power factor can be reduced to less than about 1 percent. The low power factor must be retained over a long life period extending for many years in AC power applications. The aromatic esters most suitable for the purposes of this invention are in this category, and are preferred in this invention. Best results have been obtained with DOP as the only or principal impregnant. DOP may be mixed with other impregnants preferably the aromatic esters for changes in certain of its characteristics. Mixtures of aromatic esters and other impregnants may also be employed preferably where the ester predominates. Examples of other aromatic esters useful in the practice of this invention are dibutyl phthalate, diethyl phthalate, dimethyl phthalate, di n-octyl phthalate, dinonyl phthalate, and diisodecyl phthalate. This invention may also be practiced with esters other than those of phthalic acid, for example those of phosphoric acid or benzoic acid. Specific examples include tricresyl phosphate and triphenyl phosphate.

This invention as practiced, specifically with aromatic esters as described, has shown the most dramatically improved results. An epoxide stabilized aromatic ester, such as DOP, provides an impregnant unexpectedly equal to and better in some instances than the best impregnant in use at the present time, chlorinated diphenyl.

The additive of this invention may be introduced into a capacitor by several means. It may be added to the polypropylene dielectric material during its manufacture to be incorporated in the material, or it may be added to the liquid DOP before or after introduction in the capacitor casing. It is preferred that the additive be combined with the DOP as a solution, and the solution used to impregnate the capacitor.

A primary reason for this preference is that the esters including DOP are sensitive to elevated temperatures and may undergo serious alteration or changes with increasing temperatures. Accordingly, adding the epoxide to the ester prior to such heating, particularly during the impregnation process, serves to stabilize the ester, quite apart from stabilization in the capacitor environment.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A long life capacitor comprising
   a. a sealed casing,
   b. at least one capacitor roll section sealed in said casing,
   c. said roll section comprising a pair of electrodes and a dielectric material therebetween,
   d. a non-halogenated impregnant in said casing and impregnating said roll section,
   e. said impregnant comprising a liquid aromatic ester and an epoxide additive capable of interaction with chemical impurities present in or generated in the capacitor during operation thereof to prevent electrical degradation of said capacitor.

2. The invention as in claim 5 wherein said additive is a high molecular weight low volatility liquid epoxide.

3. The invention as recited in claim 5 wherein said aromatic ester is a phthalate ester.

4. The invention as recited in claim 1 wherein said aromatic ester is DOP.

5. The invention as recited in claim 1 wherein said epoxide is a diglycidyl ether of bisphenol A.

6. The invention as in claim 1 wherein epoxide is added in an amount from 0.1 to 10 percent by weight.

7. The invention as in claim 1 wherein a paper dielectric is at least a part of said dielectric material.

8. The invention as in claim 1 wherein a synthetic resin is at least a part of said dielectric.

9. The invention as in claim 1 wherein polypropylene is at least a part of said dielectric material.

10. The invention in claim 1 wherein said dielectric comprises a mixed dielectric of polypropylene and paper.

11. The invention in claim 1 wherein paper comprises all the said dielectric material.

12. The invention as in claim 1 wherein a synthetic resin comprises all the dielectric material.

13. The invention is claim 12 wherein polypropylene comprises all the said dielectric material.

14. The invention as in claim 9 wherein said polypropylene is under an AC voltage stress at the application voltage of said capacitor of from about 750 to in excess of 1,200 volts per mil thickness of said polypropylene and said capacitor has a long life low power factor of less than about 1.0 percent measured at room temperature.

15. The invention as recited in claim 18 wherein said voltage stress is in excess of about 900 volts per mil and said capacitor has an operable power factor of less than about 0.5 percent.

16. The invention as recited in claim 12 wherein said pair of electrodes comprise a metallized surface on a synthetic resin strip.

17. The invention as recited in claim 16 wherein said strip and said dielectric comprises polypropylene.

* * * * *

UNITED STATES PATENT OFFICE
CERTIFICATE OF CORRECTION

Patent No. 3,754,173  Dated August 21, 1973

Inventor(s) John W. Eustance

It is certified that error appears in the above-identified patent and that said Letters Patent are hereby corrected as shown below:

Column 2, line 25, change "2" to -- the --; same line after "of", cancel "DC" and insert -- direct current, DC, --; line 27, after "of", cancel "AC", and insert -- alternating current, AC, --; line 30, cancel "even greater"; line 35, cancel "tricresyl phosphate", and insert -- dibutyl phthalate --. Column 3, line 12, "not" should read -- now --. Column 4, line 26, "Range" should read -- Point --; lines 29 and 30, cancel "(1499-18cc) (1499=2.5cs)" Column 8, line 34, after "phenoxy" insert -- propylene --; line 64, change "important" to -- importance --. Column 9, line 45, "corono" should read -- corona --. Column 10, lines 23, 24, cancel ", made from dinormal-actyl alcohol"; line 29, "eqully" should read -- equally --. Claim 2, line 1 and claim 3, line 1, change "5" to -- 1 --. Claim 15, line 1, change "18" to -- 14 --. On the cover sheet, insert -- [73] Assignee: General Electric Company --.

Signed and sealed this 19th day of November 1974.

(SEAL)
Attest:

McCOY M. GIBSON JR.
Attesting Officer

C. MARSHALL DANN
Commissioner of Patents

PO-1050
(5/69)

UNITED STATES PATENT OFFICE
CERTIFICATE OF CORRECTION

Patent No. 3,754,173  Dated August 21, 1973

Inventor(s) John W. Eustance

It is certified that error appears in the above-identified patent and that said Letters Patent are hereby corrected as shown below:

Column 7, line 17, in Example II in the title, cancel "and 85°C"

Column 7, line 18, in Example II in the title of the data in the fourth column, after "strength" insert "at 85°C"

Signed and sealed this 29th day of April 1975.

(SEAL)
Attest:

RUTH C. MASON
Attesting Officer

C. MARSHALL DANN
Commissioner of Patents
and Trademarks